United States Patent [19]
Andrassy

[11] 3,938,497
[45] Feb. 17, 1976

[54] APPARATUS FOR SOLAR COOKING

[76] Inventor: Stella Andrassy, Ridge Road, Kingston, N.J. 08528

[22] Filed: Dec. 10, 1974

[21] Appl. No.: 531,279

[52] U.S. Cl. .................. 126/270; 126/400; 99/423
[51] Int. Cl.² .......................................... F24J 3/02
[58] Field of Search ....... 126/270, 271, 400; 99/423

[56] References Cited
UNITED STATES PATENTS

| | | | |
|---|---|---|---|
| 1,683,266 | 9/1928 | Shipman | 126/271 |
| 2,760,920 | 8/1956 | Olsen | 126/270 |
| 2,859,745 | 11/1958 | VonBrudersdorff | 126/270 |
| 2,909,171 | 10/1959 | Lof | 126/270 |
| 3,025,851 | 3/1962 | Steinberg | 126/270 |
| 3,171,403 | 3/1965 | Drescher | 126/270 |
| 3,236,294 | 2/1966 | Thomason | 165/48 |
| 3,391,688 | 7/1968 | Dery | 126/270 |
| 3,463,577 | 8/1969 | Friedberg | 126/270 X |

*Primary Examiner*—John J. Camby
*Assistant Examiner*—Henry C. Yuen
*Attorney, Agent, or Firm*—Sperry and Zoda

[57] ABSTRACT

Solar cooking apparatus is provided with a frame or base readily movable to locate the apparatus in a favorable exposure to the sun and embodies an oven provided with mirrors or reflectors arranged to direct the suns rays onto a food support or the like positioned within the oven. The oven itself is tiltable on the frame to follow the sun from morning to evening whereas the food support is movable within the oven to permit it to maintain a horizontal position in any tilted position of the oven.

4 Claims, 6 Drawing Figures

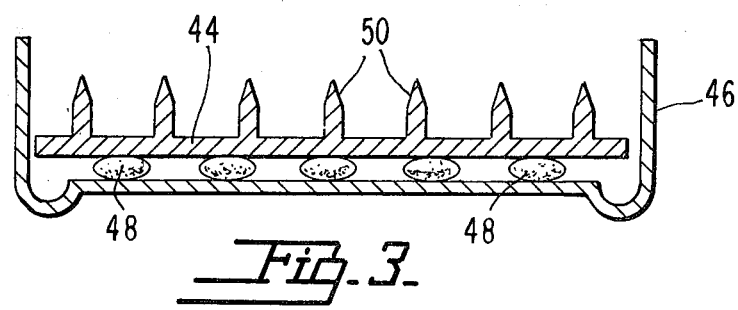
_Fig._3_
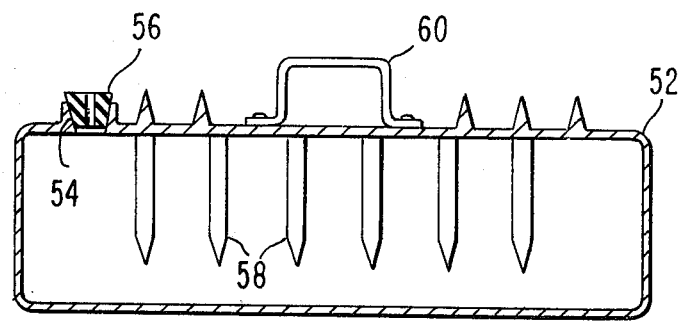
_Fig._4_
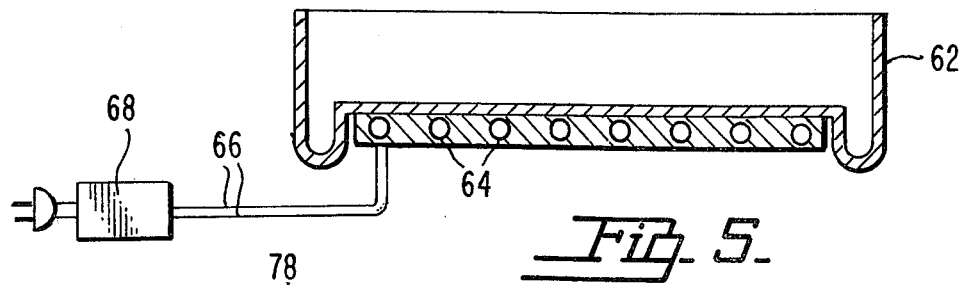
_Fig._5_
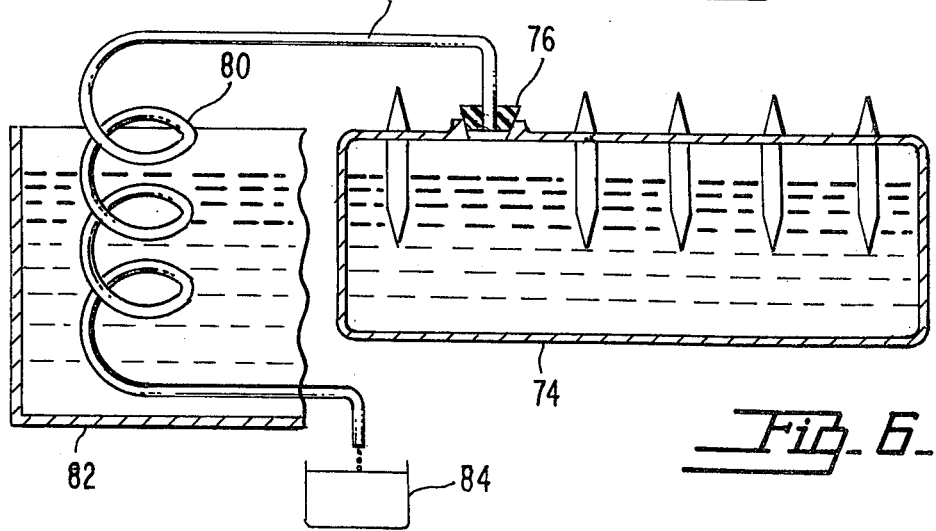
_Fig._6_

APPARATUS FOR SOLAR COOKING

BACKGROUND OF THE INVENTION

1. Field of the Invention

The advent of the present energy crisis has increased the importance of alternative energy sources such as a solar radiation. This invention deals with an improved apparatus for making use of solar heat for cooking.

Solar ovens have been known in various forms since the latter half of the nineteenth century. The purpose of the present invention is to provide an apparatus for cooking by using solar heat which cooks in approximately the same amount of time as normal cooking apparatus and also imparts the desired texture, temperature and color to the foodstuffs.

2. Description of the Prior Art

One of the most basic problems with solar ovens is the inability to follow the daily movement of the sun in its' semi-circular path from the east to the west. Another difficulty with following solar movement is that throughout the day the angular altitide of the sun in the sky changes continuously. The sun reaches an apparent maximum height approximately at noon and is positioned intermediate between this maximum height and the horizon throughout the remainder of the day.

In association with this problem is the desire to maintain the platform upon which the food is cooking at a level attitude, irrespective of movement of the solar oven shell itself. It is desirable to maintain this level attitude throughout the day with the most simple apparatus possible. The simplicity is necessary since solar ovens are inherently fine instruments and need to be relocatable to be sheltered during periods of bad weather and during the night.

Solar ovens have historically suffered from a dependence upon weather conditions and a corresponding lengthy cooking period. On overcast days where solar rays are shielded by cloud cover for long periods of time the heat accumulated in the solar oven will be dissipated and the cooking activity will temporarily cease. Often the sun will remain clouded over for sufficiently long periods to prevent the cooking function, and even if the sun intermittently heats the oven, the result is a sufficiently cooked foodstuff but without the normally desired texture and coloring. It is for these reasons that solar ovens have been recognized up to the present time as a mere curiosity. The disadvantages have overshadowed the many advantages of solar ovens such as the elimination of fire hazards, kitchen odors and excessive household heat. These factors are all in addition to the fuel saving aspect of the solar oven. The present invention encompasses all these advantages and in addition overcomes the difficulties experienced in the prior art.

SUMMARY OF THE INVENTION

The solar cooking apparatus of the present invention embodies a frame or support which is readily movable to position the apparatus in the most favorably exposed location for receiving the sun's radiation. A solar oven is mounted on the frame and is supported on rollers or other bearing means which permit the oven to be tilted to various positions so as to permit it to receive the maximum amount of sunlight as the sun moves from east to west during the period when articles are to be heated or cooked.

The oven is formed to present a lower semi-cylindrical portion within which a food support or utensil is located. The food support is then provided with rollers or the like permitting the food support to be moved with respect to the oven so as to be maintained in a substantially horizontal position adjacent the center of the lower semi-cylindrical portion of the oven at all times and when the oven is tilted to any angular position to which it may be moved for effective exposure and reflection of the sun's rays into the oven. Further, the oven is provided with upwardly and outwardly inclined reflecting surfaces or mirrors for directing the sun's rays toward the interior of the oven and onto the food support or tray located in the approximate center of the oven.

A transparent cover or sheet of material formed of glass or plastic extends across the upper portion of the oven and serves to confine the heat produced by absorption of the suns radiation within the oven and about the articles on the food support. At the same time the cover shields the food from wind and air currents and protects it from access to flies, insects and dust to which it would otherwise be exposed.

In preferred forms of the invention special heat absorbing and transmitting covers are provided for the food support or utensil to facilitate the heating or cooking of particular foods or products within the solar oven.

BRIEF DESCRIPTION OF THE DRAWINGS

FIGS. 3 to 6 are vertical sectional views through special forms of utensils and covers therefor adapted for use in the solar oven apparatus of the present invention.

DESCRIPTION OF THE PREFERRED EMBODIMENTS

Figure 1:
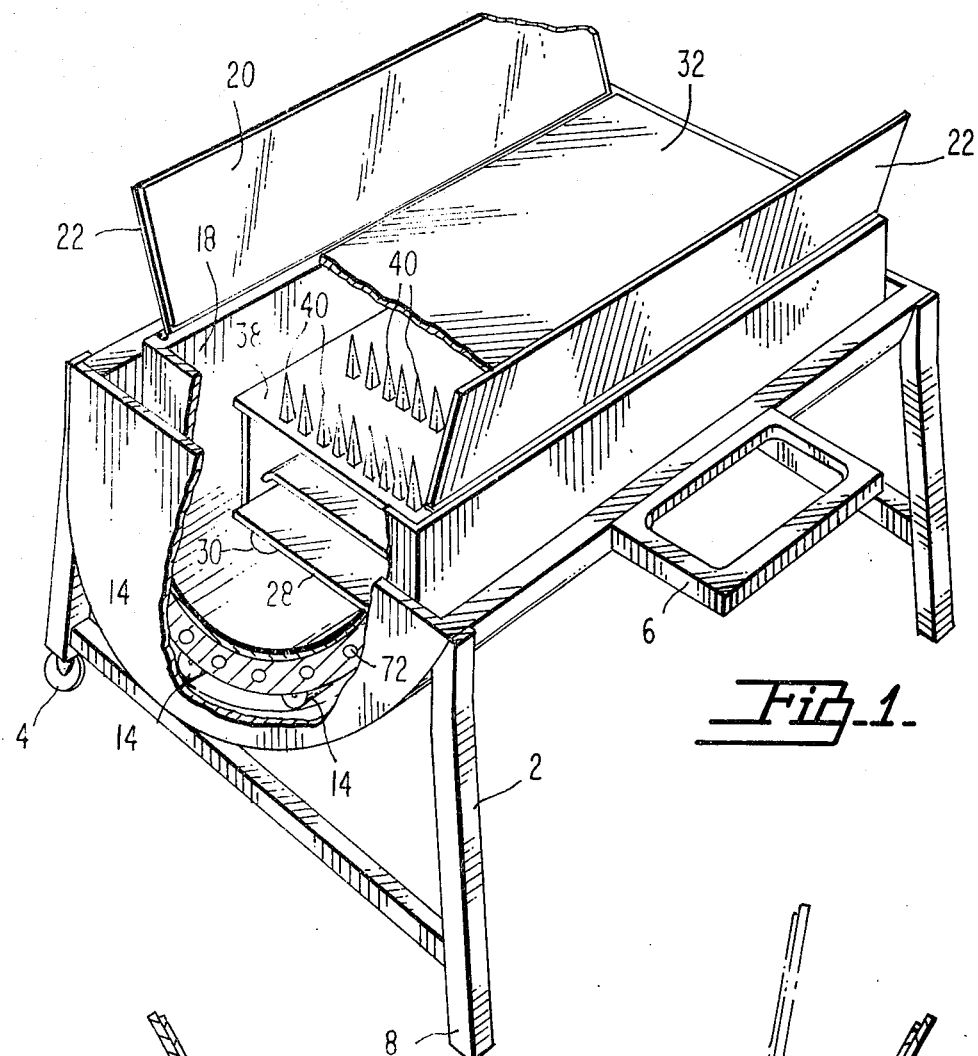
FIG. 1 is a perspective illustrating a typical embodiment of the present invention with a part thereof broken away.

In that form of the invention chosen for purposes of illustration in the drawing, the solar cooking apparatus embodies a frame or support 2 which may be of any suitable construction. As shown, the frame is provided with wheels 4 and a handle 6 to enable the apparatus to be readily moved about to position it in a desired location where it will be effectively exposed to the sun. A leg 8 is secured to the frame 2 and engagable with the ground to hold the apparatus in a fixed position to which it has been moved.

The oven 10 is supported on the frame 2 and is formed with a lower portion 12 which is preferably semi-cylindrical in shape and designed to rest upon rollers or other suitable bearing elements 14 mounted upon arcuate or semi-circular member 16 of the frame 2. The oven 10 preferably presents a concave inner reflecting surface 18 adapted to direct reflected rays of the sun inward toward the central portion of the oven. Additional reflecting surfaces 20 are provided on the inner surface of upwardly and outwardly extending members 22 located adjacent the upper edges 24 and 26 of the semi-cylindrical lower portion 12 of the oven. The members 22 and their reflecting surfaces 20 may be adjustably movable if desired to most effectively concentrate the reflected rays of the sun on the articles to be heated within the oven.

Figure 2:
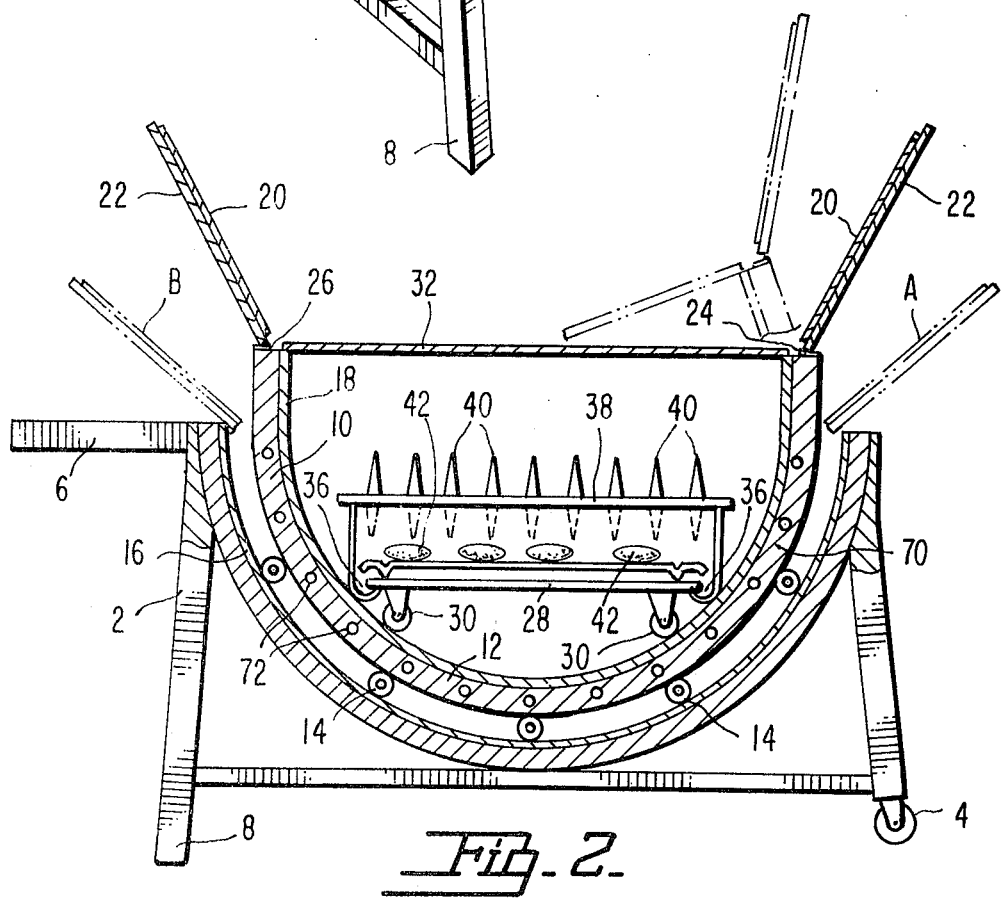
FIG. 2 is a vertical sectional view of the apparatus illustrated in FIG. 1.

The upper edges 24 and 26 of the oven project above the adjacent sides of the frame 2 when the oven is in its central or vertical position as shown in full lines in FIG. 2 but is tiltable as shown in dotted lines A and B direct the open upper portion of the oven toward the sun in the morning and afternoon or at other times and to position the additional reflecting surfaces 20 in the most effective locations for directing the sun's rays into the oven.

A tray or support 28 is located within the oven and provided with rollers or other bearing members 30 engagable with the concave inner surface 18 of the oven. The article support 28 is thus movable with respect to the oven 10 so as to continuously maintain a horizontal position while the oven and its reflecting surfaces may be tilted or moved to positions which will serve to concentrate the sun's rays most effectively on any articles located on the support.

The oven is further provided with a transparent cover 32 which extends across the oven above the article support and may be hinged or connected at one edge thereof to the edge 24 of the oven while the opposite edge of the cover rests upon or is secured to the opposite edge 26 of the oven. The cover member 32 may be formed of glass, transparent plastic or other material which will effectively transmit the sun's rays and particularly the infrared rays which serve to develop heat upon contact with articles located on the support 28. The cover 32 not only serves to confine the heat produced within the oven but also serves to shield the interior of the oven from wind and air currents which might dissipate such heat and protects against the entrance of dust, flies or insects which could otherwise come in contact with food being cooked out of doors.

The construction thus provided is movable about to permit it to be located in the most favorable position to receive the direct rays of the sun while the oven itself is tiltable to focus the oven toward the sun and to change its position from time to time as the sun moves from east to west during the period required to heat or cook the articles on the support 28. At the same time the article support is held in a level horizontal position within the oven so that the articles being cooked or heated will not be displaced on the support and any drippings or other liquid from or about the articles on the support will not be spilled.

The article support 28 may serve as a cooking utensil and as shown in FIG. 2 may be in the form of a pan within which a rack 34 is located whereas a marginal trough or other depressions 36 may be provided in the bottom of the pan to receive liquids and drain them away from the articles being cooked or heated. Further if desired the support or utensil 28 may be provided with a cover 38 having heat transmitting elements 40 in the form of pins or fins by which additional heat may be transmitted to or from the cover. Thus, as shown in FIG. 2, the cover 38 may be formed with upwardly extending fins 40 for conducting heat most effectively from the space above the support to the cover 38. However, if desired the cover may be inverted to conduct heat from the cover 38 directly to the food or articles 42 enclosed between the support 28 and the cover 38.

Other types of utensils or article supports may be employed and as shown in FIG. 3 the cover 44 may be of smaller area than the pan or utensil 46 so as to rest directly upon articles 48, such as meat patties, to cook them more rapidly and under limited pressure. At the same time, the cover 44 may be provided with pins or heat transmitting elements 50 for increasing the area of the cover to which heat is transmitted to the articles within the utensil 46.

The utensil 52 shown in FIG. 4 is designed for heating water as a tea kettle and for this purpose forms an enclosure provided with an inlet opening 54 in which a stopper or cap 56 having the usual whistle element is located. Heat transferring pins or fins 58 project inwardly from the top and bottom of the enclosure to promote the transfer of heat to water in the utensil and a handle 60 is secured to the utensil to permit it to be tilted or handled in the same manner as a conventional tea kettle.

In the construction shown in FIG. 5 the pan or utensil 62 may be of any preferred shape but is provided in its base or elsewhere with an auxilliary heating element 64 including an electrical resistance device to which current may be supplied through conductors 66 under control of a switch 68 that may be operated manually or by sensing means such as a thermostat, electric eye or, the like. The construction thus provided renders it possible to maintain the utensil 62 at a desired or constant temperature at all times during a cooking operation and on cloudy or partially cloudy days when the sun goes under a cloud. At the same time the maximum utilization of solar heat and the maximum conservation of electrical energy is effected by the utilization thereof in combination as supplemental energy sources for heating and cooking purposes. In this way a minimum consumption of electricity is assured while controlled and uniform cooking temperatures may be maintained. In order to increase the efficiency of the apparatus further the over 10 is preferably provided with heat storage means such as thermal insulation extending about the sides of the semi-cylindrical lower portion 12 thereof as indicated at 70. In the alternative or in addition to such thermal insulation the oven may be provided with heat storage means in the form of a chamber or tubes 72 containing a heat retaining liquid such as sodium sulfate, dehydrated castor oil or the like. In this way the temperature of the oven can be maintained at a constant and elevated temperature for long periods of time and during cloudy periods when the sun is temporarily obscured.

As illustrated in FIG. 6 the equipment of the present invention may be used for distillation purposes to purify water or for the development of low pressure steam or for other purposes. Thus the chamber 74 may be provided with a stopper 76 having a tube 78 passing through the same extending to a coil 80 located on the exterior of the apparatus where it may be positioned in the shade or in a tank 82 for delivering distillate to a receptacle 84 or the like. Such constructions are particularly adapted for use in disaster areas, deserts or wherever contaminated water is prevalent.

The constructions thus provided are highly efficient and practical and not only serve to utilize solar energy and to conserve fuels and energy which would otherwise be used, but also are found to retain and enhance the color, flavor and aroma of meats and other articles which are heated or cooked therein.

While typical and preferred forms of equipment embodying the present invention have been illustrated in the drawings and described above, it will be apparent that numerous changes and modifications may be made in the form, construction and arrangement of the elements of the combination employed. In view thereof it should be understood that the particular embodiments thereof disclosed are intended to be illustrative only.

I claim:
1. A solar cooking oven comprising
   a. a frame;
   b. an oven of concave configuration tiltably mounted on said frame to afford maximum exposure of the interior of the oven to solar radiation;
   c. an article support located in said oven adjacent the center thereof;
   d. and rollers located between said oven and article support to permit movement of said support to a horizontal position in any tilted position of said oven.
2. A solar cooking oven as defined in claim 1 wherein reflecting elements are movably mounted adjacent the upper edges of said oven to direct solar radiations into the interior of said oven.
3. Solar cooking apparatus as defined in claim 1 wherein:
   a. rollers are located between said oven and said frame to permit said oven to be moved to various tilted positions for favorable exposure to the sun; and
   b. additional rollers are located between said oven and food support to permit said food support to be maintained in a horizontal position when said oven is moved from one tilted position to another.
4. Solar cooking apparatus as defined in claim 1 wherein said oven is provided with auxilliary heating means.

* * * * *